(No Model.)
H. H. & A. TURNER & J. JENKINS.
APPARATUS FOR HEATING AND SOFTENING THE BRIMS OF HATS.
No. 428,539. Patented May 20, 1890.
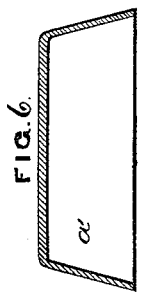
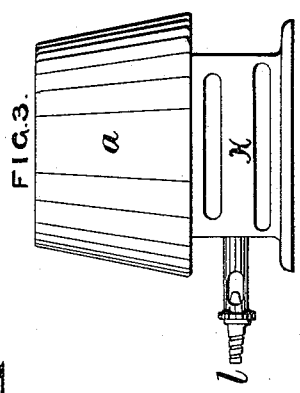
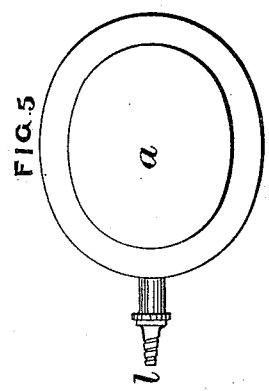
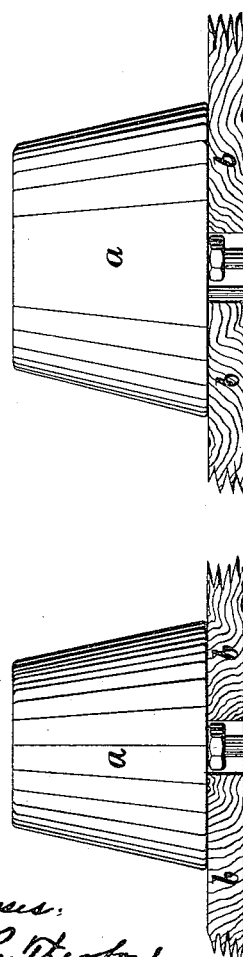
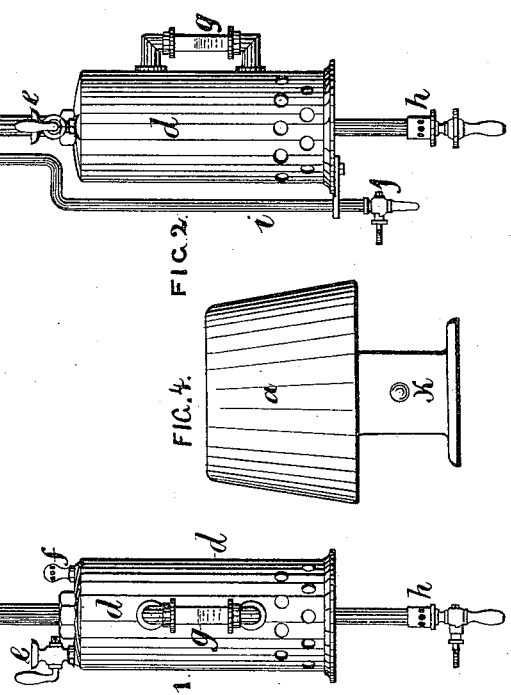
Witnesses:
J. A. Rutherford
Dennis Sumby
Inventors:
Henry Herbert Turner
Albert Turner
James Jenkins
By James L. Norris
Attorney

UNITED STATES PATENT OFFICE.

HENRY HERBERT TURNER AND ALBERT TURNER, OF DENTON, COUNTY OF LANCASTER, AND JAMES JENKINS, OF CARDIFF, COUNTY OF GLAMORGAN, ENGLAND.

APPARATUS FOR HEATING AND SOFTENING THE BRIMS OF HATS.

SPECIFICATION forming part of Letters Patent No. 428,539, dated May 20, 1890.

Application filed November 6, 1889. Serial No. 329,460. (No model.) Patented in England April 6, 1889, No. 5,881.

*To all whom it may concern:*

Be it known that we, HENRY HERBERT TURNER and ALBERT TURNER, subjects of the Queen of Great Britain, and residents of Denton, England, and JAMES JENKINS, a subject of the Queen of Great Britain, and a resident of Cardiff, Wales, have invented certain new and useful Improvements in Apparatus for Heating and Softening the Brims of Hats, for use by retail hatters, (for which we have obtained patent in Great Britain, No. 5,881, dated April 6, 1889,) of which the following is a specification.

Our invention relates to apparatus for heating and softening brims of hats; and the purpose thereof is to provide a simple, inexpensive, and easily-operated mechanism, suitable for use in retail establishments, whereby the hat may be quickly and accurately fitted, the generation of too high a temperature avoided, and the expenditure of time and labor greatly economized as compared with present methods.

The invention consists in the novel parts and combinations of parts hereinafter fully described, and definitely pointed out in the claims following this specification.

To enable those skilled in the art to make and use my said invention, I will now describe the same in detail, reference being had to the accompanying drawings, in which—

Figure 1 is a front elevation of an apparatus embodying my invention, showing a steam-heating apparatus combined. Fig. 2 is a side elevation of the same. Fig. 3 is a side elevation of a similar apparatus, showing the adaptation of a Bunsen burner thereto. Fig. 4 is a front elevation of the parts shown in Fig. 3. Fig. 5 is a plan view of the same. Fig. 6 is a sectional view of the asbestus cap.

In the said drawings, the reference-letter $a$ designates the sheet-metal cone-shaped block, so constructed and arranged as to be adapted to various sizes of hats, and having a flat top to render it capable of use in heating the lures used by hatters. This block is provided with an asbestus or other non-conducting cap $a'$, which is placed upon the block when the hat is being treated to soften the brim, and whereby the heat is prevented from rising to the top.

The block $a$ may be supported upon a table or counter $b$, as shown in Figs. 1 and 2, and from its bottom drops the pipe $c$, which connects said block with the steam-generating vessel $d$. This vessel is provided with a cock $e$, having a funnel-mouth for refilling it, and with a safety-valve $f$ and gage-glass or water-glass $g$. The steam-generator may be heated by a Bunsen burner $h$, as shown, or by any suitable form of vaporizer for hydrocarbon oils, or any suitable pattern of heat-generator. The steam-pipe $c$ communicates with the interior of the block $a$, which is wholly inclosed, the said pipe being packed through its bottom wall. To allow the escape of air, a pipe $i$ is provided, which may be carried downward and provided with a cock $j$.

The operation is extremely simple. The boiler $d$ being supplied with water to the proper height, the burner is ignited and the air-cock $j$ is opened. As soon as steam begins to issue from the latter it is closed and the block is speedily heated by its contained steam, thereby insuring a temperature which cannot injure the hat. We may, however, substitute for the steam-heater the form of apparatus shown in Figs. 3, 4, and 5, wherein the letter K denotes a hollow cast-iron casing forming a heating-chamber, upon which the block $a$ is supported. The chamber may be heated by a Bunsen gas-burner supplied by a flexible or other tube connected to the tail-pipe $l$, or any desired or preferred form of heater, either gas or oil, may be substituted therefor.

This apparatus is especially useful for a retail hatter in his store or fitting-room, as it wholly avoids the method heretofore employed of filling the body of the hat and then heating the same.

We do not confine ourselves to any particular form of steam-generator or heat-producing apparatus, as very many familiar devices are well adapted to use with our invention.

What we claim is—

1. The combination, with an inflexible hollow closed conoidal block, of a steam-generator connected with its interior and means for withdrawing the air therefrom upon the entrance of steam, substantially as described.

2. The combination, with a hollow closed conoidal block, of a heat-generator heating said block from its interior outward and a non-conducting cap fitting upon said block and receiving the hat, substantially as described.

3. The combination, with an inflexible hollow closed conoidal block, of a steam-generator connected by a pipe with its interior, an air-pipe communicating with the interior of the block and supplied with a cock, and a non-conducting cap of asbestos or other material fitting upon the top of the block, substantially as described.

4. A hollow block having a closed flat top and heated from its interior outward by a gas or other burner or heat-generator, substantially as described.

In testimony whereof we affix our signatures to the foregoing specification.

HENRY HERBERT TURNER.
ALBERT TURNER.
JAMES JENKINS.

Witnesses to the signatures of Henry Herbert Turner and Albert Turner:
JOHN G. WILSON,
WALTER GUNN.

Witnesses to the signature of James Jenkins:
FRANCIS CHARLES PAWSON,
C. R. WILLIAMS.